(12) United States Patent
Ruggieri et al.

(10) Patent No.: US 11,931,314 B2
(45) Date of Patent: Mar. 19, 2024

(54) DOSING CAPSULE

(71) Applicant: BORMIOLI PHARMA S.P.A., Milan (IT)

(72) Inventors: Lorenzo Ruggieri, Milan (IT); Riccardo Trabattoni, Seregno (IT); Andrea Maldifassi, Saronno (IT); Gianluca Brugnerotto, Milan (IT)

(73) Assignee: BORMIOLI PHARMA S.P.A., Milan (IT)

( * ) Notice: Subject to any disclaimer, the term of this patent is extended or adjusted under 35 U.S.C. 154(b) by 0 days.

(21) Appl. No.: 17/763,695

(22) PCT Filed: Sep. 23, 2020

(86) PCT No.: PCT/IB2020/058875
§ 371 (c)(1),
(2) Date: Mar. 25, 2022

(87) PCT Pub. No.: WO2021/084336
PCT Pub. Date: May 6, 2021

(65) Prior Publication Data
US 2022/0323303 A1    Oct. 13, 2022

(30) Foreign Application Priority Data
Oct. 30, 2019    (IT) .................... 102019000020104

(51) Int. Cl.
A61J 1/22       (2006.01)
A61J 7/00       (2006.01)
G01F 11/26      (2006.01)

(52) U.S. Cl.
CPC .............. *A61J 1/22* (2013.01); *A61J 7/0053* (2013.01); *G01F 11/263* (2013.01); *A61J 2200/76* (2013.01)

(58) Field of Classification Search
CPC ......... G01F 11/12; G01F 11/26; G01F 11/263
See application file for complete search history.

(56) References Cited

U.S. PATENT DOCUMENTS

| | | | | |
|---|---|---|---|---|
| 2,828,893 | A | * | 4/1958 | Stewart ............... B65D 47/242 222/453 |
| 3,141,579 | A | * | 7/1964 | Medlock ............... A47G 19/32 222/207 |
| 4,314,657 | A | * | 2/1982 | Perakis ................ G01F 11/263 222/453 |
| 4,886,193 | A | * | 12/1989 | Wassilieff ........... B65D 47/242 141/383 |

(Continued)

FOREIGN PATENT DOCUMENTS

| | | |
|---|---|---|
| WO | 2008070838 A1 | 6/2008 |
| WO | 2013055200 A1 | 4/2013 |

(Continued)

*Primary Examiner* — Timothy L Maust
(74) *Attorney, Agent, or Firm* — Pearne & Gordon LLP; Bryan M. Gallo

(57) ABSTRACT

A capsule for dosing a substance to be administered orally, comprising:—a dosing chamber (2) for the substance;—an access route (6) for access of the substance into the chamber (2);—a valve (3) which permits/prevents the supply of the substance to the dosing chamber (2) through the access route (6);—a connection means (4) for connecting to a mouth of a container.

10 Claims, 3 Drawing Sheets

(56) References Cited

U.S. PATENT DOCUMENTS

| | | | | |
|---|---|---|---|---|
| 4,966,312 A | | 10/1990 | Waring | |
| 5,044,527 A | * | 9/1991 | Hickerson | G01F 11/263 |
| | | | | 222/456 |
| 5,078,305 A | * | 1/1992 | Glynn | G01F 11/263 |
| | | | | 222/456 |
| 5,186,367 A | * | 2/1993 | Hickerson | G01F 11/263 |
| | | | | 222/476 |
| 5,407,104 A | * | 4/1995 | Santagiuliana | G01F 11/262 |
| | | | | 222/455 |
| 5,584,420 A | * | 12/1996 | Awada | G01F 11/263 |
| | | | | 222/525 |
| 5,601,212 A | * | 2/1997 | Lee | G01F 11/32 |
| | | | | 222/207 |
| 5,909,824 A | * | 6/1999 | Qian | B67D 3/0045 |
| | | | | 222/1 |
| 6,068,165 A | * | 5/2000 | Minihane | G01F 11/32 |
| | | | | 222/448 |
| 6,131,774 A | * | 10/2000 | Thomas | G01F 11/34 |
| | | | | 222/440 |
| 6,343,723 B1 | * | 2/2002 | Hickerson | G01F 11/263 |
| | | | | 222/476 |
| 10,058,484 B2 | * | 8/2018 | Battle | A61J 7/0046 |
| 10,138,029 B2 | * | 11/2018 | Im | G01F 11/12 |
| 2008/0134780 A1 | | 6/2008 | Micheli | |
| 2015/0166224 A1 | * | 6/2015 | Greiner-Perth | B65D 51/16 |
| | | | | 222/522 |

FOREIGN PATENT DOCUMENTS

| | | | | |
|---|---|---|---|---|
| WO | 2019199801 A1 | 10/2019 | | |
| WO | WO-2019199801 A1 | * 10/2019 | | A61J 1/05 |

* cited by examiner

DOSING CAPSULE

TECHNICAL FIELD

The present invention relates to a dosing capsule applicable to a container. It is used for dosing a substance to be administered orally, typically in liquid form (which may be more or less viscous); in particular it is used for dosing pharmaceutical products.

BACKGROUND ART

Applications in which the substance to be administered is placed in a bottle are known. This bottle is accompanied by a small transparent cup provided with a graduated scale. The cup is separate from the bottle and placed in the same package. The user pours the right amount of substance into the cup.

This solution is not free from drawbacks. First of all, the cup is separate from the container and therefore risks being lost. Furthermore, the cup permits to dose the right amount of product, but it must be consumed immediately. A further major drawback is that the dosing of the product is not very ergonomic. For dosing, it is advisable to use both hands or alternatively one hand which holds the bottle and a perfectly flat surface which minimizes the risk of spilling the substance (which, in the case of syrups for example, is sticky and troublesome to remove once it stains the surrounding surfaces).

DISCLOSURE OF THE INVENTION

In this context, the technical task underlying the present invention is to propose a dosing capsule which permits the maximum ergonomics and ease of use.

The stated technical task and specified objects are substantially achieved by a capsule comprising the technical features disclosed in one or more of the appended claims.

BRIEF DESCRIPTION OF DRAWINGS

Further characteristics and advantages of the present invention will become more apparent from the indicative and thus non-limiting description of a preferred but not exclusive embodiment of a capsule, as schematically illustrated in the appended drawings, in which.

DETAILED DESCRIPTION OF PREFERRED EMBODIMENTS OF THE INVENTION

Figure 1:
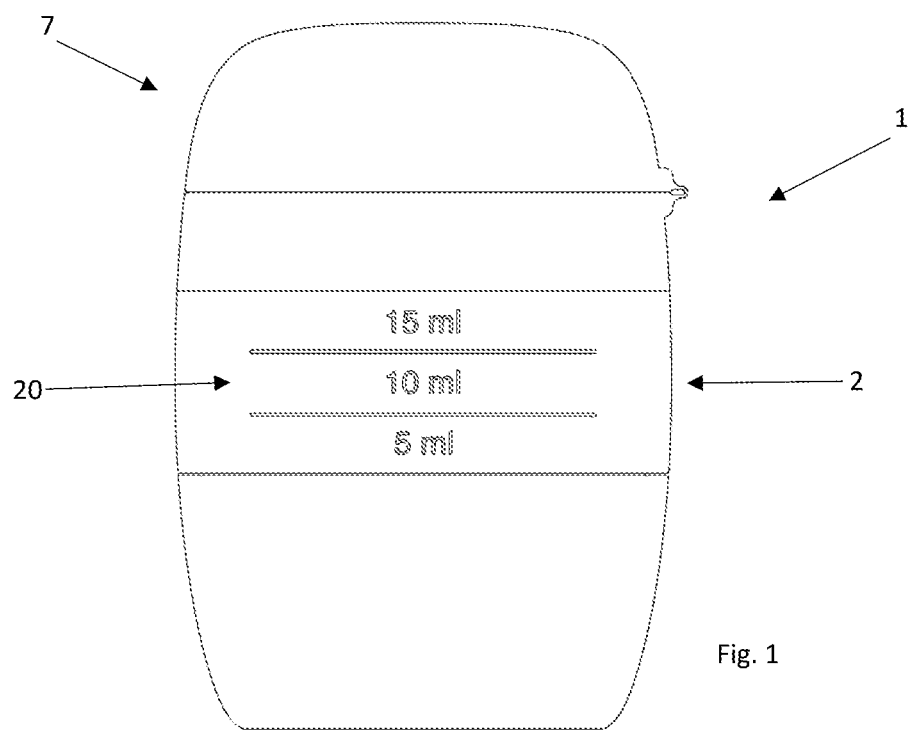
FIGS. 1 and 2 show two lateral views of a capsule according to the present invention.
Figure 2:
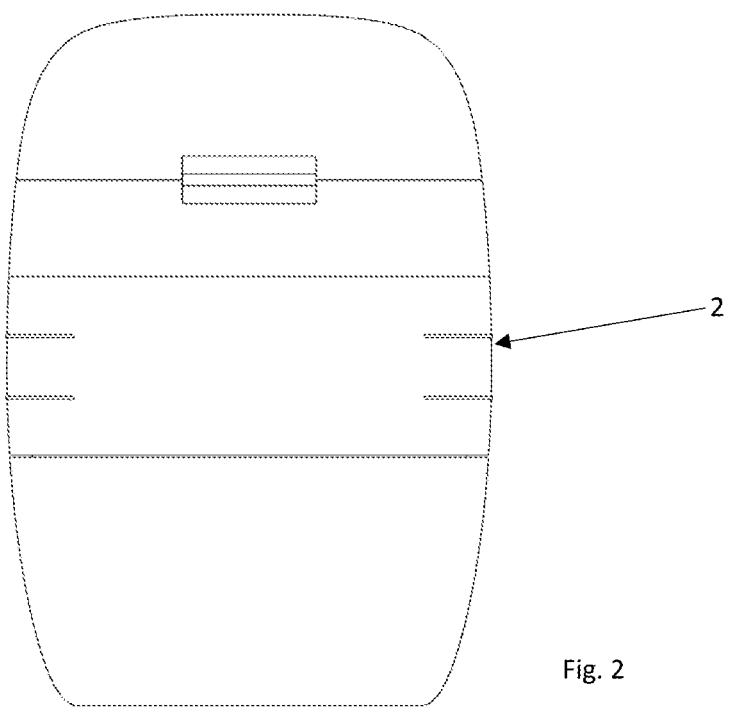
Figure 3:
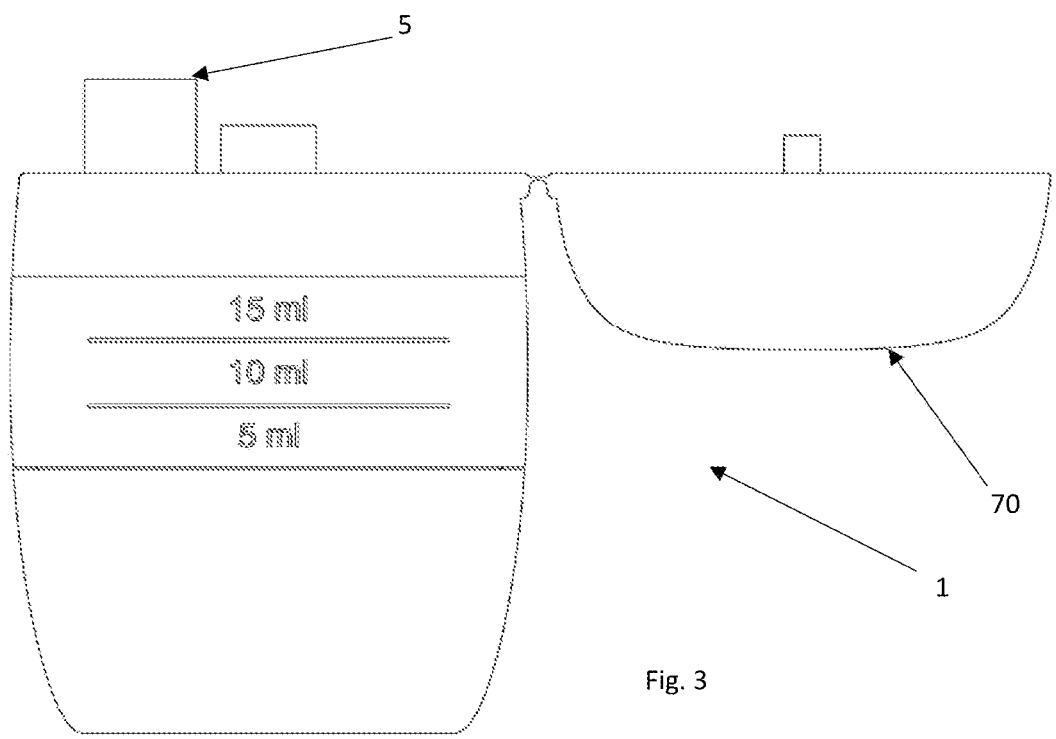
FIGS. 3 and 4 show two lateral views of the capsule of FIGS. 1 and 2 in a different configuration.
Figure 4:
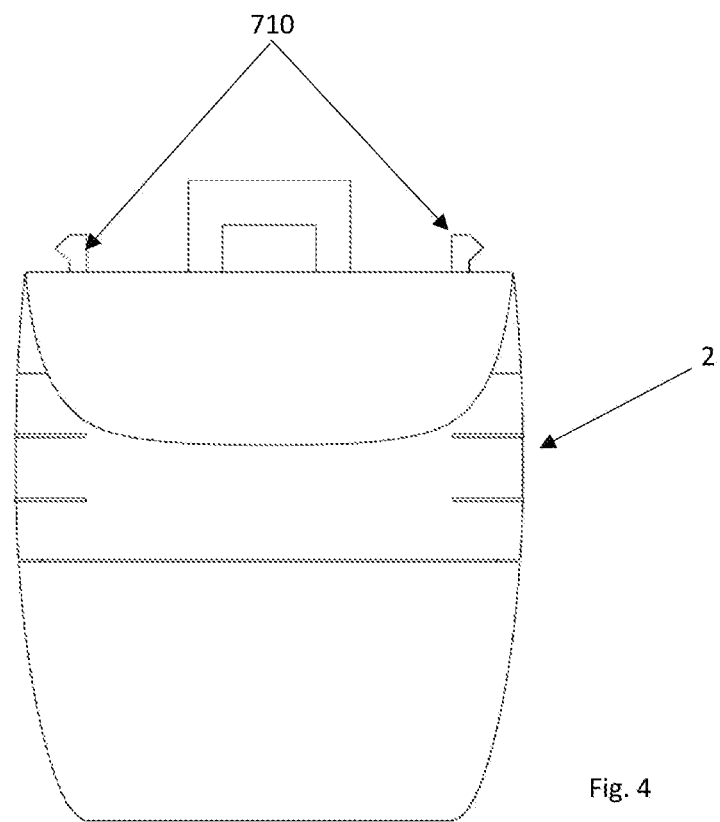
Figure 5:
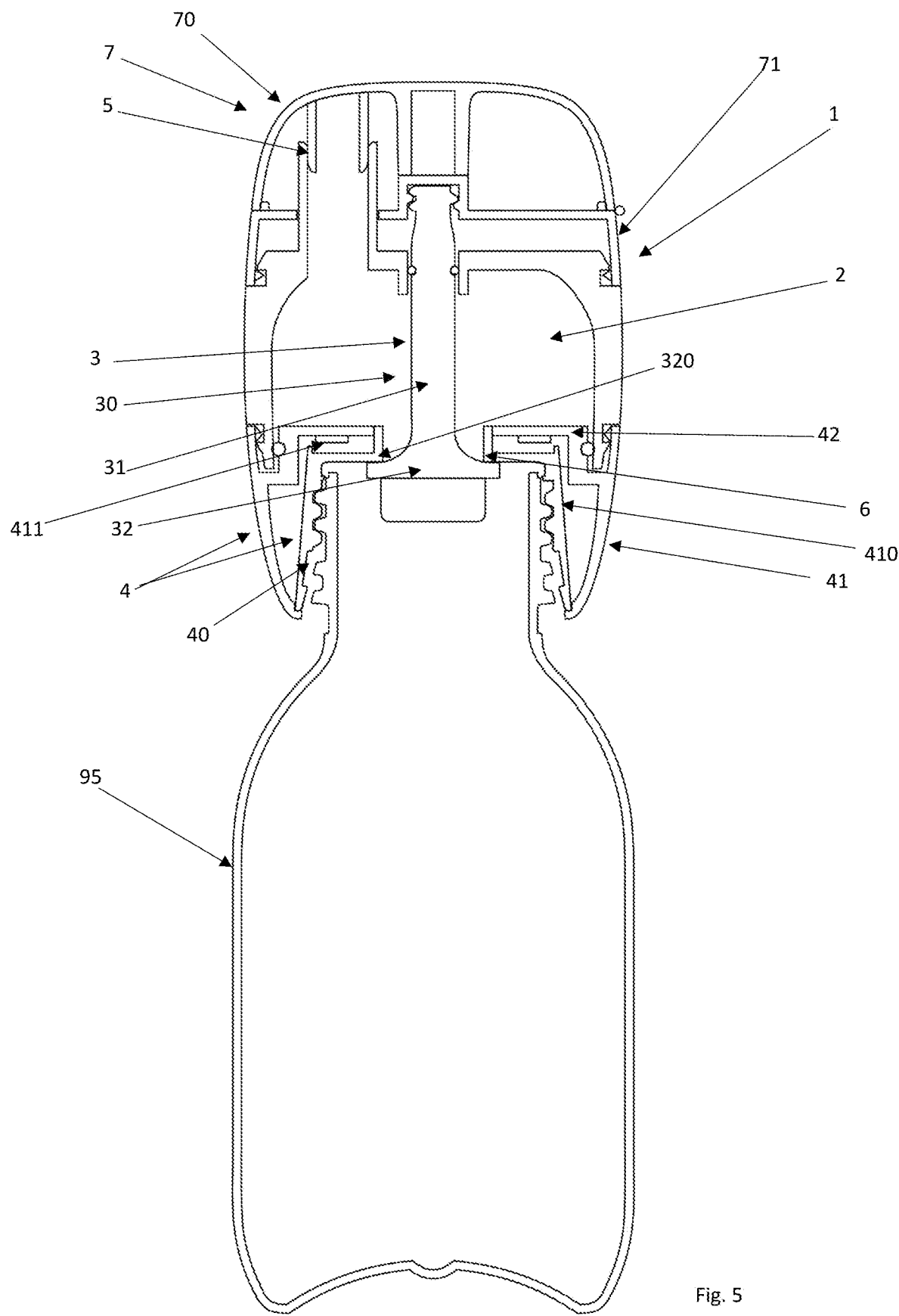
FIG. 5 shows a sectional view of a capsule according to the present invention applied to a container.

In the appended figures, reference numeral 1 denotes a capsule for dosing a substance. It is suitably a substance to be administered orally.

The capsule 1 comprises a dosing chamber 2 for the substance. Suitably, the dosing chamber 2 may comprise at least one at least partially transparent portion. This is to permit the user to look inside the dosing chamber 2 and to understand the filling level. Suitably, the dosing chamber 2 may comprise level indicators 20 for understanding the filling degree. Possibly, the level indicators 20 may be a graduated scale. The level indicators 20 may also be absent; in this case, for example, the total filling of the dosing chamber 2 makes it possible to understand that the desired dose has been reached.

The capsule 1 suitably comprises an access route 6 of the substance into the chamber 2. Such an access route 6 may comprise a conduit or may even be defined only by an access mouth.

The capsule 1 comprises a valve 3 which permits/prevents the supply of the substance to the dosing chamber 2 through the access route 6. The valve 3 comprises for example a plunger 30. Typically the valve 3 or the plunger 30 comprises a stem 31 and a plate 32. When the supply of the substance to the dosing chamber 2 is prevented, the valve 3 blocks the access route 6. In particular, the plate 32 abuts against an abutment surface 320. When the supply of the substance to the dosing chamber 2 is permitted, the plate 32 is distanced from the abutment surface 320.

Suitably, the plunger 30 crosses the chamber 2 from side to side. In an alternative solution not shown, the valve 3 could comprise a membrane valve or other type of valve. In the preferred embodiment the valve 3 is bidirectional. If activated, it therefore permits the fluid to pass in both directions. The valve 3 therefore permits to be crossed to permit the substance to enter the dosing chamber 2, but also to permit it to outflow or better the return thereof to the container (for example if the user mistakenly permits too much substance to enter the dosing chamber 2).

Suitably, the capsule 1 comprises a connection means 4 for connecting to a mouth of a container. For example, the connection means 4 could comprise a connection thread 410 connecting with the container. The capsule 1 may then be screwed to a container. In an alternative solution the capsule 1 could be connected to the container, for example with snap or interference connections or still otherwise.

Suitably, the access route 6 is located or in any case extends at least in part at the connection means 4. In particular, the connection means 4 defines a cavity 40 in which the thread 410 for connecting with a container is placed. The access route 6 suitably opens into the chamber 40. In particular, it opens at a top of the cavity 40. This cavity 40 is intended to face the container connected to the capsule 1.

The capsule 1 comprises a dispenser 5 for the outflow of the substance from the dosing chamber 2. The dispenser 5 is separate from the access route 6. For example, the dispenser 5 comprises a spout. The dispenser 5 is suitably integrated as a single monolithic body in the dosing chamber 2.

Suitably, the dispenser 5 is located on the opposite side of the dosing chamber 2 relative to the access route 6.

The dosing chamber 2 is suitably not compressible. It is therefore defined by a rigid element.

The capsule 1 comprises a protective cap 7 of the dispenser 5.

Suitably, the capsule 1 takes on an operating configuration in which said cap 7 (preferably closed) is brought nearer to said connection means 4 and a rest configuration in which said cap 7 (preferably closed) is brought less near to the connection means 4 than in the operating configuration.

In the operating configuration the valve 3 is open; in the rest configuration the valve 3 is closed.

The cap 7 comprises a cover 70 and a base 71 supporting the cover 70.

Suitably the cover 70 is constrained, preferably hinged, to the base 71.

Suitably with the cap 7 closed, the cover 70 is connected to the base 71 by elastically deformable means 710. In particular, such elastically deformable means 710 comprises an elastic tooth and an element for retaining an elastic tooth; the elastic tooth and the retaining element are obtained one in said base 71 and one in said cover 70.

Suitably, the cover 70 is openable by means of a joint pressure at two predetermined points of the cover 70. This is in order to prevent accidental opening by a child (child-proof system). Suitably, these two predetermined points are located on two opposite sides of the cover 70. The elastically deformable means 710 is in a median position with respect to the two opposite sides. Suitably the cap 7 is a single monolithic body (preferably made of a plastic material).

Suitably the valve 3 comprises a plunger 30 constrained to the base 71. A movement of the base 71 causes a movement of the plunger 30. Suitably the plunger 30 (in particular one end of the plunger 30 opposite the plate 32) is screwed to the cap 7 or rather to the base 71.

Preferably the capsule 1 comprises a removable abutment placed between the cap 7 and the dosing chamber 2. The presence of the abutment prevents the passage from the rest configuration to the operating configuration. The removal of the abutment permits the passage from the rest configuration to the operating configuration. The abutment is suitably annular. It suitably surrounds the dosing chamber 2. The abutment therefore defines a strap. The abutment may therefore be considered a warranty or tamper-proof seal (which ensures that the capsule 1 has not already dispensed the substance through the dispenser 5).

In the preferred solution, the connection means 4 comprises:
  i) a first portion 41 comprising a thread 410 for connecting with a container;
  ii) a second portion 42 solidly joined to the dosing chamber 2.

The second portion 42 is movable between:
  a position near the first portion 41 in which the second portion 42 mechanically interacts with the first portion 41 so as to permit the screwing or unscrewing of the first portion 41 relative to the container; this mechanical interaction typically occurs by engaging; in fact, in the near position the first and second portions 41, 42 mutually engage and a torque is transmitted from the second portion 42 to the first portion 41; this torque permits the screwing or unscrewing of the first portion relative to the container;
  a position away from the first portion 41, in which the second portion 42 rotates without engaging (therefore substantially in idle mode) with the first portion 41.

To switch from the away position to the near position, the user typically pushes the container towards the cap 7, causing a movement of the second portion 42 towards the container.

Once the user's pushing action has ceased, the second portion 42 spontaneously (e.g., substantially elastically) returns to the away position.

The first and the second portion 41, 42 comprise a toothed means 411 and the other corresponding cavities intended to interact with the toothed means in the near position of the second portion 42.

Suitably, the capsule 1 may comprise a shutter (not shown in the attached figures) of the access route 6. Such a shutter is applicable in the cavity 40 for example after the capsule 1 has been removed from the container 95.

This prevents the risk that the capsule 1, once no longer connected to the container, can release to the outside the substance placed in the dosing chamber 2 (in fact, in the preferred solution the valve 3 is bidirectional). In a configuration in which the capsule 1 is connected to the container, the shutter is for example removed and separate.

The subject matter of the present invention is further a dosing method of a substance placed in a container 95 to which a capsule 1 having one or more of the characteristics described above is applied. The method suitably comprises the step of placing the capsule 1 beneath the container 95, maintaining the capsule 1 connected to the container 95. This is typically carried out by tipping the container 95 upside down (thus positioning the neck of the container 95 downwards and the bottom of the container 95 upwards).

The method then comprises the step of pushing the capsule 1 (or rather the cap 7 of the capsule 1) towards the container 95, thus causing the valve 3 to open and permitting the flow by gravity of the substance from the container 95 to the dosing chamber 2. In fact, the step of pushing the capsule 1 towards the container 95 involves moving the plunger 30 connected to the cap 7. By pushing the capsule 1 towards the container 95, the plunger 30 opens a connection between the dosing chamber 2 and the container 95 (therefore the substance may move from the container 95 to the dosing chamber 2 through the access route 6). In fact, by pushing the capsule 1 towards the container (or rather towards the cap 7), the plate 32 of the plunger 30 moves away from the abutment surface 320, permitting the passage of the substance between the plate 32 and the abutment surface 320.

The method further comprises the step of stopping the step of pushing the container 95 towards the capsule 1; this causes the valve 3 to be closed once a desired amount of the substance is reached in the dosing chamber 2.

The method further comprises the step of taking (ingesting) the substance present in the dosing chamber 2. This preferably occurs by opening the cap 7 and dispensing the substance through the dispenser 5.

The step of taking the substance may occur with the capsule 1 still connected to the container 95 or after having removed it from the container 95.

If the capsule 1 is removed from the container 95 to permit the user to carry a dose of the substance therewith, a shutter is suitably placed in the cavity 40 (or in any case a blocking shutter of the route 6 which opens into the cavity 40).

Suitably, the method may include reintroducing the substance placed in the dosing chamber 2 into the container 95 applied to the capsule 1. With the capsule 1 placed above the container 95, this comprises the sub-step of pushing the capsule 1 (or rather the cap 7) towards the container 95, this causing the opening of the valve 3 and the outflow by gravity of the substance from the chamber 2 to the container 95.

The present invention achieves important advantages.

Firstly, it permits to provide an ergonomic dosing capsule which can be operated even with only one hand.

The capsule 1 may be connected to the container 95, thus reducing the risk of the loss thereof.

Furthermore, after dosing the product, the capsule may be removed from the container and transported so that it can be administered later (useful for example to be able to take a dose of product in the middle of the day when the user is away from home). In addition, the capsule permits to avoid reintroducing the product into the container if an excessive amount has been accidentally dispensed (avoiding waste).

The invention thus conceived is susceptible to numerous modifications and variants, all falling within the scope of the inventive concept which characterises it. Furthermore, all the details can be replaced with other technically equivalent elements. In practice, all the materials used, as well as the dimensions, can be any according to requirements.

The invention claimed is:

1. A capsule for dosing a substance to be administered orally, comprising:
   a dosing chamber for the substance;
   an access route for access of the substance into the chamber;
   a valve that permits/prevents the supply of the substance to the dosing chamber through the access route;
   a connection means for connecting to a mouth of a container;
   a dispenser for the outflow of the substance from the dosing chamber; said dispenser being separated from the access route;
   a protective cap for the dispenser;
   said protective cap comprises a cover and a base supporting the cover;
   said valve comprising a plunger constrained to an elastically deformable wall support;
   a movement of the elastically deformable wall support bringing about a movement of the plunger pushing the capsule towards the container causing the valve to open.

2. The capsule according to claim 1, characterised in that said valve is bidirectional.

3. The capsule according to claim 1, characterised in that it takes on an operating configuration wherein said cap is brought nearer to said connection means and a rest configuration wherein said cap is brought less near to the connection means than in the operating configuration; in the operating configuration said valve being open; in the rest configuration the valve being closed.

4. The capsule according to claim 1, characterised in that said plunger is constrained to the base, a movement of the base bringing about a movement of the plunger.

5. The capsule according to claim 1, characterised in that the connection means comprises:
   i) a first portion comprising a thread for connecting with a container;
   ii) a second portion solidly joined to the dosing chamber and movable between:
      a position near to the first portion, wherein it interacts mechanically with the first portion so as to permit the screwing or unscrewing of the first portion relative to the container;
      a position away from the first portion, wherein it rotates without engaging with the first portion.

6. The capsule according to claim 1, characterised in that the dosing chamber consists of an incompressible element.

7. A method for dosing a substance placed in a container to which a capsule according to claim 1 is applied, comprising the steps of:
   placing the capsule beneath the container, maintaining the capsule connected to the container;
   pushing the capsule towards the container, thus causing the valve to open and permitting the flow by gravity of the substance from the container to the dosing chamber;
   stopping the step of pushing the capsule towards the container, thereby closing the valve once a desired amount of the substance is reached in the dosing chamber.

8. A capsule for dosing a substance to be administered orally, comprising:
   a dosing chamber for the substance;
   an access route for access of the substance into the chamber;
   a valve that permits/prevents the supply of the substance to the dosing chamber through the access route;
   a connection means for connecting to a mouth of a container;
   wherein the connection means comprises:
   i) a first portion comprising a thread for connecting with a container;
   ii) a second portion solidly joined to the dosing chamber and movable between:
      a position near to the first portion, wherein it interacts mechanically with the first portion so as to permit the unscrewing of the first portion relative to the container;
      a position away from the first portion.

9. A capsule according to claim 8, wherein the second portion, in the position away from the first portion, can rotate without engaging with the first portion.

10. A capsule for dosing a substance to be administered orally, comprising:
    a dosing chamber for the substance;
    an access route for access of the substance into the chamber;
    a valve that permits/prevents the supply of the substance to the dosing chamber through the access route;
    a connection means for connecting to a mouth of a container;
    a dispenser for the outflow of the substance from the dosing chamber; said dispenser being separated from the access route;
    a protective cap for the dispenser;
    wherein said protective cap comprises a cover and a base supporting the cover;
    said valve comprising a plunger constrained to the base, a movement of the base bringing about a movement of the plunger.

* * * * *